(12) United States Patent
Bengtsson et al.

(10) Patent No.: US 11,458,824 B2
(45) Date of Patent: Oct. 4, 2022

(54) CIRCUMFERENTIAL LOCK MECHANISM, BATTERY LOCKING DEVICE, POWER BATTERY PACK AND VEHICLE

(71) Applicant: NIO (ANHUI) HOLDING CO., LTD., Hefei (CN)

(72) Inventors: Jan Bengtsson, Hong Kong (CN); Nan Li, Hong Kong (CN); Xikun Ding, Hong Kong (CN); Xiaotao Tian, Hong Kong (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 746 days.

(21) Appl. No.: 16/468,793

(22) PCT Filed: Dec. 7, 2017

(86) PCT No.: PCT/CN2017/114895
§ 371 (c)(1),
(2) Date: Jun. 12, 2019

(87) PCT Pub. No.: WO2018/108014
PCT Pub. Date: Jun. 21, 2018

(65) Prior Publication Data
US 2020/0094666 A1 Mar. 26, 2020

(30) Foreign Application Priority Data
Dec. 12, 2016 (CN) .......................... 201611137583.8

(51) Int. Cl.
*B60K 1/04* (2019.01)
*F16B 19/02* (2006.01)
(Continued)

(52) U.S. Cl.
CPC .................. *B60K 1/04* (2013.01); *B60K 1/00* (2013.01); *F16B 19/02* (2013.01); *H01M 50/20* (2021.01);
(Continued)

(58) Field of Classification Search
CPC . B60K 1/00; B60K 1/02; F16B 19/02; H01M 50/20
See application file for complete search history.

(56) References Cited

U.S. PATENT DOCUMENTS 3,816,882 A 6/1974 Maeda et al.
5,022,875 A * 6/1991 Karls ..................... F16B 39/108
440/49

(Continued)

FOREIGN PATENT DOCUMENTS

CN 202106830 1/2012
CN 203254949 10/2013
(Continued)

OTHER PUBLICATIONS

Extended Search Report for European Patent Application No. 17881487.7, dated Jun. 9, 2020, 6 pages.
(Continued)

*Primary Examiner* — Jonathan Ng
*Assistant Examiner* — James J Triggs
(74) *Attorney, Agent, or Firm* — Sheridan Ross P.C.

(57) ABSTRACT

A circumferential locking mechanism, a battery securing device comprising same, a battery pack, and a vehicle are provided. The circumferential locking mechanism (100) comprises: a first component (110), the first component (110) comprising a first body (111) and pins (112) extending from the first body (111) in an axial direction, the pins (112) being distributed on the first body (111) along a first circumference; a second component (120), the second compo-
(Continued)

nent (120) comprising a second body (121) and a limiting face (122) on the second body (121), the limiting face (122) extending in a circumferential direction and comprising segments, the radius of the limiting face (122) tapering in both the axial and circumferential directions at the segments; and a third component for impelling the first component (110) to engage with the second component (120), wherein the first component (110) and the second component (120) are arranged such that the first circumference and the limiting face (122) are coaxial, and when the first component (110) is engaged with the second component (120), the pins (112) abut against the limiting face (122). The pins (112) can be fitted to the limiting face (122) by means of the foregoing structure to complete continuous locking.

26 Claims, 5 Drawing Sheets

(51) Int. Cl.
*H01M 50/20* (2021.01)
*B60K 1/00* (2006.01)
*B60L 50/60* (2019.01)
*B60L 53/80* (2019.01)

(52) U.S. Cl.
CPC ....... *B60K 2001/0455* (2013.01); *B60L 50/66* (2019.02); *B60L 53/80* (2019.02); *H01M 2220/20* (2013.01); *Y02E 60/10* (2013.01)

(56) References Cited

U.S. PATENT DOCUMENTS

| | | | |
|---|---|---|---|
| 6,669,419 B1* | 12/2003 | Fleetwood | F16B 43/00 411/533 |
| 7,008,158 B2* | 3/2006 | Madden, III | F16B 39/10 411/119 |
| 11,274,696 B2* | 3/2022 | Saeki | F16B 39/028 |
| 2006/0216129 A1* | 9/2006 | Lin | F16B 39/282 411/161 |
| 2015/0354618 A1* | 12/2015 | Kim | F16B 39/24 411/81 |
| 2016/0305757 A1 | 10/2016 | Rhee | |
| 2020/0124081 A1* | 4/2020 | Bengtsson | F16B 39/10 |

FOREIGN PATENT DOCUMENTS

| | | |
|---|---|---|
| CN | 203543623 | 4/2014 |
| CN | 204175767 | 2/2015 |
| CN | 205039467 | 2/2016 |
| CN | 106080159 | 11/2016 |
| CN | 206617391 | 11/2017 |
| FR | 3015774 | 6/2015 |

OTHER PUBLICATIONS

Official Action for China Patent Application No. 201611137583.8, dated Jul. 9, 2018, 5 pages.
International Search Report for International (PCT) Patent Application No. PCT/CN2017/114895, dated Feb. 26, 2018, 2 pages.

* cited by examiner

CIRCUMFERENTIAL LOCK MECHANISM, BATTERY LOCKING DEVICE, POWER BATTERY PACK AND VEHICLE

CROSS REFERENCE TO RELATED APPLICATIONS

This application is a national stage application under 35 U.S.C. 371 and claims the benefit of PCT Application No. PCT/CN2017/114895, having an international filing date of 7 Dec. 2017, which designated the United States, which PCT application claimed the benefit of China Patent Application No. 201611137583.8 filed 12 Dec. 2016, the disclosure of each of which are incorporated herein by reference.

TECHNICAL FIELD

The invention relates to the technical field of circumferential anti-loosening and locking of components, and particularly to a circumferential locking mechanism.

Further, the invention further relates to a vehicle, a battery pack, and a battery securing device comprising the circumferential locking mechanism.

BACKGROUND ART

It is often experienced that relatively rotating between two components needs to be restricted.

For example, how to ensure a constant pre-tightening force in a threaded connection is a difficult problem in the industry. Currently, common anti-loosening structures include a movable threaded member provided with a multi-tooth anti-loosening structure, a groove-shaped anti-loosening structure, or the like. The structures can provide only limited graduated locking and positioning. With these techniques, an engagement angle of the threaded member is uncertain when a threading torque reaches a predetermined value. If teeth or grooves cannot be engaged at a corresponding angle, the threaded member is still susceptible to loosening, and constant threading torque cannot be kept.

The circumferential anti-loosening and locking techniques further include, but are not limited to, a tooth-groove connection, a key-groove connection, a pin-groove connection, a pin-hole connection, shape fitting, etc., and applying thereof is not limited to only the threaded connection, either. The structures in these techniques also can provide only limited graduated locking and positioning.

Although, continuous locking and positioning can be achieved theoretically by arranging as many graduated locking and positioning parts as possible, it is impossible to achieve the true continuous locking and positioning by doing so.

In a battery securing device of a new energy vehicle, a central pull rod of the battery securing device needs to be circumferentially positioned or locked to rapidly mount or remove a battery. For example, a Chinese Patent issued with No. CN 203543623 U discloses a battery securing device in which pins 500 on an adjustment member (integrally formed with the central pull rod) and grooves 205 on a limiting member are used to implement circumferential graduated locking and positioning. It can be seen that in this application a situation where engagement positions of pins 301 and grooves 101 is inconsistent with engagement positions of the pins 500 and the grooves 205 also exists. To avoid such inconsistent engagement positions, the pins 301 and the grooves 101 are replaced with a threaded connection in the prior art. However, there are still disadvantages that continuous locking and positioning cannot be implemented and constant threading torque cannot be kept.

SUMMARY OF THE INVENTION

An object of the invention is to provide a circumferential locking mechanism which can overcome the foregoing disadvantages in the prior art.

Further, objects of the invention are further to provide a battery securing device comprising the circumferential locking mechanism, a battery pack, and a vehicle.

To achieve the foregoing objects, a first aspect of the invention provides a circumferential locking mechanism, comprising: a first component comprising a first body and pins which extend from the first body in an axial direction and are distributed on the first body along a first circumference; a second component comprising a second body and a limiting face on the second body, the limiting face extending in a circumferential direction and comprising segments, the radius of the limiting face tapering in both the axial and circumferential directions at the segments; and a third component for impelling the first component to engage with the second component, wherein the first component and the second component are arranged such that the first circumference and the limiting face are coaxial, and when the first component is engaged with the second component, the pins abut against the limiting face.

Optionally, in the foregoing circumferential locking mechanism, the number of the pins is the same as that of the segments, and the pins and the segments are evenly distributed in the circumferential direction, respectively.

Optionally, in the foregoing circumferential locking mechanism, the segments are connected end to end.

Optionally, in the foregoing circumferential locking mechanism, the pin is a cylindrical pin.

Optionally, in the foregoing circumferential locking mechanism, the pin, at least at an end thereof, is a semi-cylindrical pin cut in a radial direction relative to the first circumference.

Optionally, in the foregoing circumferential locking mechanism, the third component is a spiral spring.

Optionally, in the foregoing circumferential locking mechanism, the limiting face is an outer peripheral side face of the second body, and the distance from the pin to the center of the first circumference is greater than the radius of the outer peripheral side face throughout the top thereof but less than the radius of the outer peripheral side face throughout the bottom thereof, and the pin has a sufficient length to engage with the outer peripheral side face throughout a circumference of the outer peripheral side face.

Optionally, in the foregoing circumferential locking mechanism, the limiting face is an inner peripheral side face of the second body, and the distance from the pin to the center of the first circumference is less than the radius of the inner peripheral side face throughout the top thereof but greater than the radius of the inner peripheral side face throughout the bottom thereof, and the pin has a sufficient length to engage with the inner peripheral side face throughout a circumference of the inner peripheral side face.

Optionally, in the foregoing circumferential locking mechanism, the limiting face comprises an outer peripheral side face and an inner peripheral side face of the second body, and wherein the limiting face is an outer peripheral side face of the second body, and the distance from the pin to the center of the first circumference is greater than the radius of the outer peripheral side face throughout the top thereof but less than the radius of the outer peripheral side face throughout the bottom thereof, and the pin has a sufficient length to engage with the outer peripheral side face throughout a circumference of the outer peripheral side face; and the distance from the pin to the center of the first circumference is less than the radius of the inner peripheral side face throughout the top thereof but greater than the radius of the inner peripheral side face throughout the bottom thereof, and the pin has a sufficient length to engage with the inner peripheral side face throughout a circumference of the inner peripheral side face.

Optionally, in the foregoing circumferential locking mechanism, the outer peripheral side face and the inner peripheral side face form a limiting groove, a radial width of the pin is less than the width of the limiting groove throughout a groove opening but greater than the width of the limiting groove throughout a groove bottom, and the pin has a sufficient length to extend into the limiting groove at any circumferential position and to engage with the outer peripheral side face and the inner peripheral side face.

Optionally, in the foregoing circumferential locking mechanism, the limiting groove extends along a second circumference, the radius of the second circumference is the same as that of the first circumference, the center of the pin is on the first circumference, and a median line of the radial width of the limiting groove is on the second circumference.

To achieve the foregoing objects, a second aspect of the invention provides a battery securing device, comprising the circumferential locking mechanism according to any one of the first aspect.

Optionally, in the foregoing battery securing device, the first component is an adjustment member of the battery securing device, and the adjustment member is circumferentially fixed relative to a central pull rod of the battery securing device but is axially movable along the central pull rod; and the second component is a limiting member of the battery securing device.

To achieve the foregoing objects, a third aspect of the invention provides a battery pack for a vehicle, the battery pack comprising the battery securing device according to any one of the second aspect.

Optionally, in the foregoing battery pack, the battery securing device is fixed to the battery pack via the second component.

To achieve the foregoing objects, a fourth aspect of the invention provides a vehicle, comprising the battery securing device according to any one of the second aspect.

Optionally, in the foregoing vehicle, a battery pack of the vehicle is secured to the vehicle via the battery securing device.

In the circumferential locking mechanism, the battery locking mechanism comprising same, the battery pack, and the vehicle according to the invention, a limiting face tapering in two directions is used, and a fit between the pins and the limiting face is used to complete continuous locking, that is, locking can be implemented when the pins fall to any circumferential positions. In addition, this solution has a simple structure and reliable locking.

BRIEF DESCRIPTION OF THE DRAWINGS

The disclosure of the invention will be more apparent with reference to the accompanying drawings. It should be appreciated that these accompanying drawings are merely used for the purpose of description, and are not intended to limit the scope of protection of the invention. In the figures.

DETAILED DESCRIPTION OF EMBODIMENTS

Figure 1:
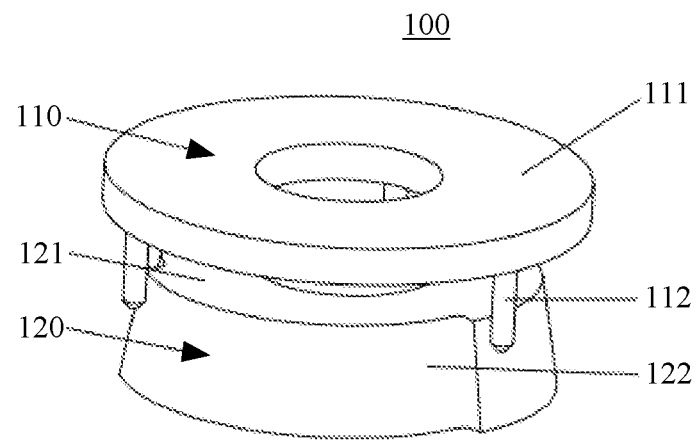
FIG. 1 is a schematic diagram of an embodiment of a circumferential locking mechanism according to the invention.

Specific embodiments of the invention are described below in detail with reference to the accompanying drawings. In the accompanying drawings, the same reference numerals represent the same or corresponding technical features.

FIG. 1 is a schematic diagram of an embodiment of a circumferential locking mechanism according to the invention. As can be seen from the figure, the circumferential locking mechanism 100 comprises a first component 110 and a second component 120. When the first component 110 is engaged with the second component 120, pins 112 on the first component 110 abut against a limiting face 122 on the second component 120, so as to restrict the relative circumferential rotation between the first component 110 and the second component 120. It should be understood that a person skilled in the art appreciates that any force-applying device such as a spring may be used to impel the first component to engage with the second component. Accordingly, a third component acting as force-applying is not shown in the figure.

It is conceivable that if any two components need to be circumferentially locked, they can be circumferentially locked with the circumferential locking mechanism according to the invention by circumferentially fixing them each onto the first and second members of the circumferential locking mechanism of the invention, respectively. The two components to be circumferentially locked include, but are not limited to, threaded connection members.

Figure 2:
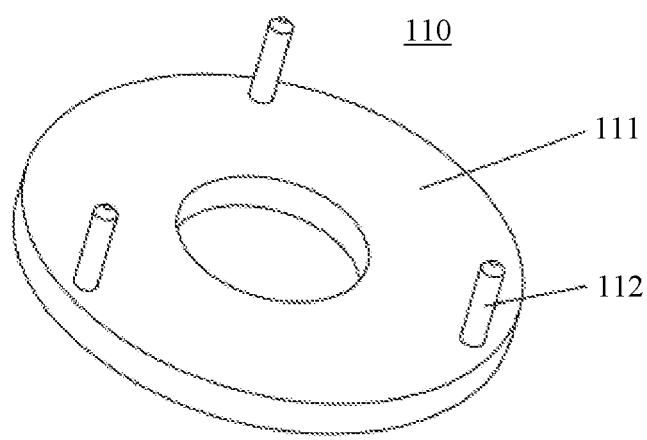
FIG. 2 shows a first component of the circumferential locking mechanism in FIG. 1.
Figure 3:
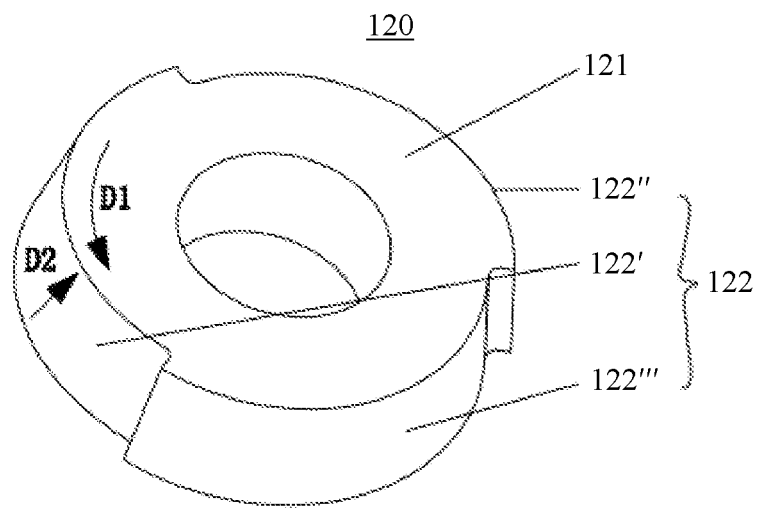
FIG. 3 shows a second component of the circumferential locking mechanism in FIG. 1.

FIGS. 2 and 3 are respectively perspective views showing the first component 110 and the second component 120 of the circumferential locking mechanism in FIG. 1 in detail.

It can be seen from FIG. 2 that the first component 110 may comprise a first body 111 and the pins 112 extending from the first body 111 in an axial direction. The pins 112 are distributed on the first body 111 along a first circumference. As can be seen from the figure, the axial direction is perpendicular to the circumferential direction. In the illustrated example, the pin 112 is a cylindrical pin. Based on this teaching, a person skilled in the art may conceive that the pins 112 may have other common pin shapes, which are not enumerated herein. In addition, although the circular first body 111 is shown in the figure, a person skilled in the art will appreciate that in specific embodiments, the first body 111 may have different specific forms, shapes, structures, etc.

It can be seen from FIG. 3 that the second component 120 comprises a second body 121 and a limiting face 122 on the second body. As shown in the figure, the limiting face 122 extends in a circumferential direction and comprises a plurality of segments 122', 122", 122''', wherein the segments 122', 122", 122''' may be connected end to end. On the basis of the first component and the second component are arranged such that the first circumference and the limiting face are coaxial, the pins 112 abut against the limiting face 122 when the first component 110 is engaged with the second component 120. In consideration of the engagement between the pins 112 and transitions of connected segments on the limiting face 122, in order to add continuous locking positions, given that the strength requirements are satisfied, the pin may be configured, at least at an end thereof, to be a semi-cylindrical pin cut in a radial direction with respect to the first circumference, such that the pin is better adapted to a start point or an end point of a segment. As shown in the figure, the radius of the limiting face tapers in both the axial and circumferential directions at the segments 122', 122", 122'''.

FIGS. 1 to 4 show a case where the limiting face 122 is an outer peripheral side face of the second body 121, in which the distance from the pin 112 to the center of the first circumference needs to be greater than the radius of the outer peripheral side face throughout the top thereof but less than the radius of the outer peripheral side face throughout the bottom thereof, and the pin 112 needs to have a sufficient length to engage with the outer peripheral side face throughout a circumference of the outer peripheral side face. By using such an arrangement, when the first component 110 is engaged with the second component 120, the pins 112 abut against the limiting face 122 on the second component 120. Since the radius of the limiting face 122 tapers in both the axial and circumferential directions at each segment, it can be seen that when the pins 112 abut against the limiting face 122, the axial movement and circumferential rotation of the pins along the limiting face 122 are locked.

In the illustrated embodiment, the first component 110 comprises three pins 112, and the limiting face 122 of the second component 120 comprises three segments 122', 122", 122'''. A person skilled in the art may understand that other number of pins and segments, for example, one, two or more, may be provided in other embodiment. Preferably, the number of the pins is the same as that of the segments, and the pins and the segments are evenly distributed along a circumference, respectively. A person skilled in the art may also conceive a case where the number of the pins is different from that of the segments. By way of example and without any limitation, when a plurality of segments exist, the number of the pins may be less than that of the segments. In addition, it will be understood that in optional embodiments, the limiting face may be formed of only segments connected end to end, and it is also conceivable to form an interval between the segments.

Figure 4:
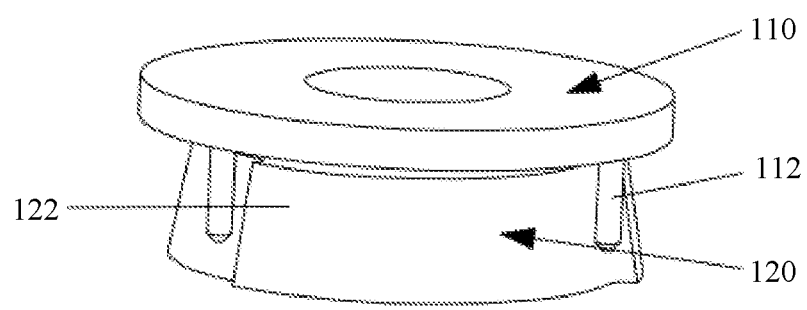
FIG. 4 shows an engaged state of the first component and the second component of the circumferential locking mechanism in FIG. 1.

The pins 112 and the limiting face 122 are arranged such that when the first component 110 is engaged with the second component 120, the pins 112 abut against the segments 122', 122", 122''' of the limiting face 122. FIG. 4 shows the first component 110 and the second component 120 of the circumferential locking mechanism in FIG. 1 in an engaged state. Here the pin 112 can abut against the limiting face 122 which means a direction in which the limiting face 122 tapers makes the limiting face be inclined towards the pin 122, indicating that the limiting face axially tapers in a direction of an arrow D2.

According to the above teaching, a person skilled in the art will appreciate that since each of the axial and circumferential directions comprises two opposite directions, bidirectional tapering in different axial and circumferential directions enables the circumferential locking mechanism to implement a locking function of the first component and the second component in different circumferential directions. Accordingly, the circumferential locking direction of the first component 110 and the second component 120 may be changed by changing the direction in which the limiting face 122 tapers. For example, in the figure, the limiting face 122 circumferentially tapers in a direction of an arrow D1, and locks the relative circumferential rotation of the first component 110 relative to the second component 120 in a direction of opposite D1. In contrast, if the limiting face 122 circumferentially tapers in the direction of opposite D1, it locks the relative circumferential rotation of the first component 110 relative to the second component 120 in the direction of D1.

With respect to the embodiment shown in FIGS. 1 to 4, it is conceivable that the limiting face 122 may also be an inner peripheral side face (for example, an inner peripheral side face 224 in FIG. 5) of the second body 121. In this case, the limiting face 122, i.e. the inner peripheral side face, forms a recessed portion on a surface of the second body 121, and the limiting face 122 forms a peripheral side face of the recessed portion.

In this case, the distance from the pin 112 to the center of the first circumference need to be less than the radius of the inner peripheral side face throughout the top thereof and greater than the radius of the inner peripheral side face throughout the bottom thereof, and the pin 112 needs to have a sufficient length to engage with the inner peripheral side face throughout a circumference of the inner peripheral side face. By using such an arrangement, when the first component is engaged with the second component, the pins 112 abut against the limiting face on the second component. Since the radius of the limiting face tapers in both the axial and circumferential directions at each segment, it can be seen that when the pins abut against the limiting face, the axial movement and circumferential rotation of the pins along the limiting face are locked. In addition, the pin can abut against the limiting face, which means that the direction in which the limiting face tapers makes the limiting face be inclined towards the pin (the inclination direction being opposite the direction of the arrow D2 in FIG. 3).

The features and description of the embodiment in FIGS. 1 to 4 are also applied to the first component and the second component of the circumferential locking mechanism in this embodiment. Details are not described herein again.

A circumferential locking mechanism having a single-sided slope anti-loosening structure is provided in the foregoing. A circumferential locking mechanism having a double-sided slope anti-loosening structure is described below with reference to FIGS. 5 and 6.

Figure 5:
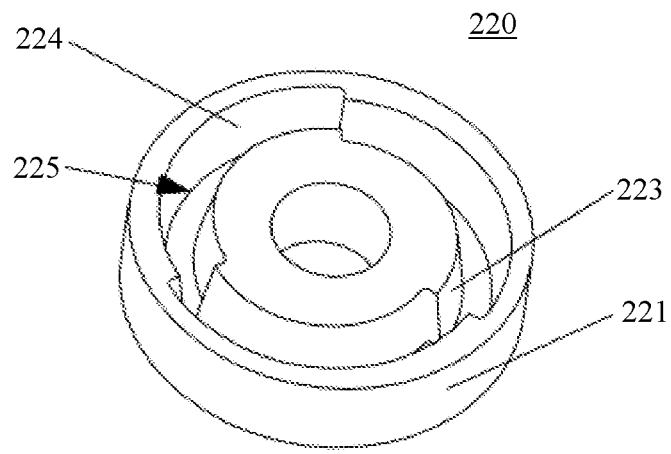
FIG. 5 is a schematic diagram of a second component in another embodiment of a circumferential locking mechanism according to the invention.
Figure 6:
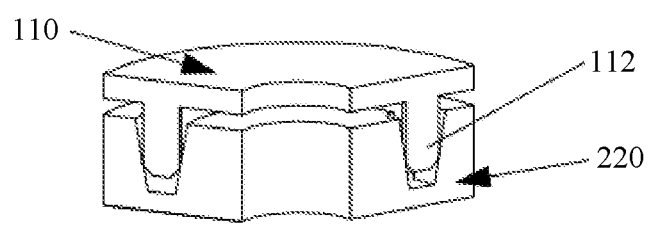
FIG. 6 is a partial schematic diagram showing an engaged state of the second component in FIG. 5 and the first component.

FIG. 5 is a schematic diagram of a second component 220 in another embodiment of a circumferential locking mechanism according to the invention. FIG. 6 is a partial schematic diagram showing the second component 220 in FIG. 5 and the first component 110 in an engaged state. A third component for impelling the first component 110 to engage with the second component 220 is also omitted in FIG. 6. It well be appreciated from the figure that in this embodiment, a limiting face 222 comprises an outer peripheral side face 223 and an inner peripheral side face 224 of the second body 221.

In such an embodiment, the distance from the pin 112 to the center of the first circumference needs to be greater than the radius of the outer peripheral side face 223 throughout the top thereof but less than the radius of the outer peripheral side face 223 throughout the bottom thereof, and the pin 110 needs to have a sufficient length to engage with the outer peripheral side face throughout a circumference of the outer peripheral side face; and at the same time, the distance from the pin 110 to the center of the first circumference needs to be less than the radius of the inner peripheral side face 224 throughout the top thereof but greater than the radius of the inner peripheral side face 224 throughout the bottom thereof, and the pin 110 needs to have a sufficient length to engage with the inner peripheral side face throughout a circumference of the inner peripheral side face. When the first component 110 is engaged with the second component 220, the pins 110 abut against both the outer peripheral side face 223 and the inner peripheral side face 224 to lock the axial movement and circumferential rotation between the first component 110 and the second component 220.

In the illustrated embodiment, the outer peripheral side face 223 and the inner peripheral side face 224 preferably form a limiting groove 225. It will be appreciated that, in this case, a radial width of the pin 110 is less than the width of the limiting groove 225 throughout a groove opening but greater than the width of the limiting groove 225 throughout a groove bottom, and the pin 110 has a sufficient length to extend into the limiting groove 225 at any circumferential position and to engage with the outer peripheral side face 223 and the inner peripheral side face 224.

In a more preferred embodiment, a limiting groove 115 extends along a second circumference, the radius of the second circumference is the same as that of the first circumference, the center of the pin is on the first circumference, and a median line of the radial width of the limiting groove is on the second circumference. Herein, the median line is a connecting line of center points of the radial widths of the limiting groove at each circumferential position. It will be understood that such a limiting groove can be machined more easily and has a better locking effect.

Figure 7:
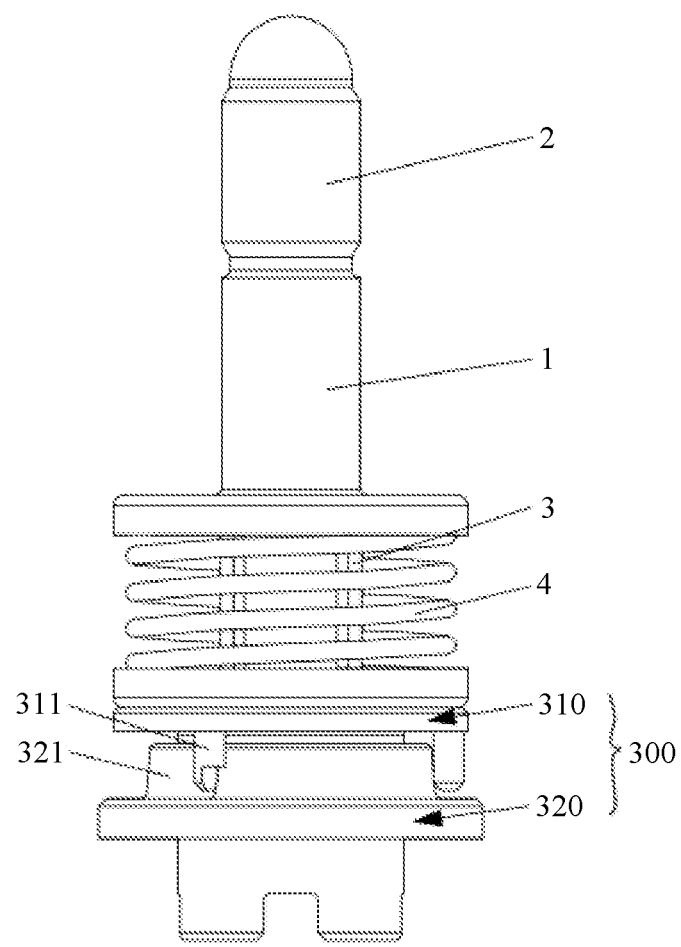
FIG. 7 is a schematic diagram of an embodiment of a battery securing device according to the invention.
Figure 8:
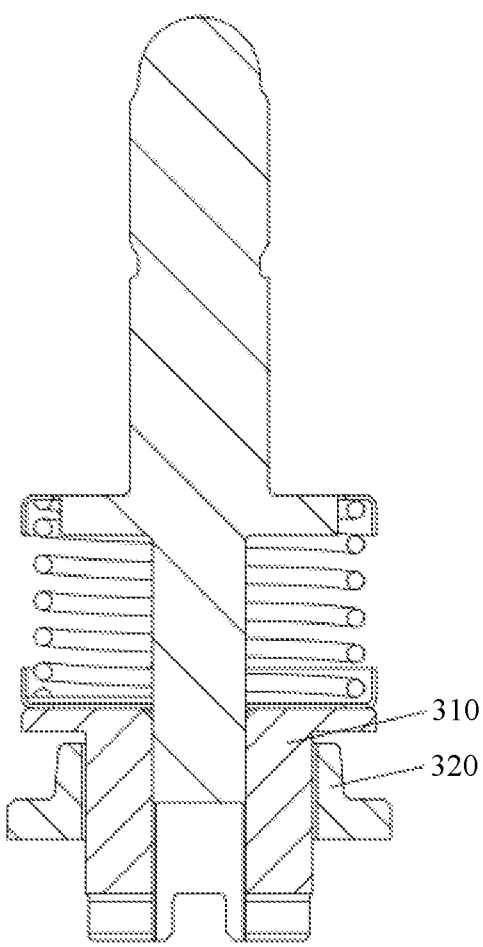
FIG. 8 is a schematic sectional view of the battery securing device in FIG. 7.

FIG. 7 is a schematic diagram of an embodiment of a battery securing device according to the invention. FIG. 8 is a schematic sectional view of the battery securing device in FIG. 7. As can be seen from the figure, such a battery securing device comprises the circumferential locking mechanism in the embodiment shown in FIGS. 1 to 4.

In FIG. 7, a central pull rod of the battery securing device comprises a retaining portion 1, a threaded portion 2, and a spline portion 3, in which a spring 4 is sleeved over the spline portion 3. In use, for example, when the battery securing device is used to secure a battery to a vehicle, the pull rod passes through a mounting frame (not shown) at the battery pack and a mounting frame (not shown) at a vehicle body in sequence, a limiting member 320 is fixed to the mounting frame of the battery pack, and the threaded portion 2 of the pull rod is in threaded connection with a support plate on the mounting frame at the vehicle body, so that the mounting frame at the battery pack and the mounting frame at the vehicle body are held at the retaining portion 1 to fix the battery pack to the vehicle body. It is conceivable that a plurality of battery securing devices shown in the figure are typically used by the vehicle to stably fix the battery pack.

To rapidly remove or mount the battery pack, a circumferential locking mechanism 300 is used in the battery locking device. The circumferential locking mechanism 300 is composed of an adjustment member 310 corresponding to the first component in FIGS. 1 to 4 and the limiting member 320 corresponding to the second component in FIGS. 1 to 4. The spring 4 is a third component for impelling the adjustment member 310 to engage with the limiting member 320. The adjustment member 310 is circumferentially fixed relative to the central pull rod but is axially movable along the central pull rod. By way of example without any limitation, a spline groove suitable for engagement with the spline portion 3 may be arranged at the center of the adjustment member 310.

It can be seen that pins 311 on the adjustment member 310 and a limiting face 321 on the limiting member 320 of the circumferential locking mechanism correspond to the design of the pins and the limiting face in FIGS. 1 and 2. During unlocking, a special purpose tool is used to push the adjustment member 310 upward to disengage same from the limiting member 320, and the adjustment member 310 is then rotated to unscrew the threaded portion 2 from the mounting frame at the vehicle body. During locking, the special purpose tool is used to push the adjustment member 310 to disengage same from the limiting member 320, and the adjustment member 310 is then rotated to tightly screw the threaded portion 2 to the mounting frame at the vehicle body. After the special purpose tool is removed, the spring 4 pushes the adjustment member 310 to enable the pins 311 of the adjustment member to abut against the limiting face 321 on the limiting member 320. The limiting member 320 locks the axial movement and circumferential rotation of the adjustment member 310.

In the foregoing operations, when the special purpose tool is used to tightly screw the threaded portion 2 on the central pull rod to the mounting frame at the vehicle body, the threading torque is typically used as a control indicator. That is, screwing is stopped when the threading torque reaches a target value, the special purpose tool is withdrawn, and the circumferential locking mechanism is used to lock the adjustment member 310 and the limiting member 320, so as to ensure a constant threading torque.

According to the battery securing device shown in FIGS. 7 and 8, when the special purpose tool is removed, as the adjustment member 310 falls to different circumferential positions under the effect of an elastic force of the spring 4, the pins 311 on the adjustment member 310 falls to the limiting face of the lower limiting member 320 by different depths. Since the limiting face 321 tapers in both the axial and circumferential directions, a shrinking channel is formed in a rotational direction. With the presence of the channel, the pins 311 on the adjustment member 310 cannot rotate relative to the limiting face 321 to implement a locking and anti-loosening effect, thereby ensuring a constant threading torque.

As can be seen from FIG. 7, a plurality of pins 311 are disposed on the adjustment member 310, which are semi-cylindrical pins at an end thereof. It will be appreciated that this is beneficial to the engagement of the pins 311 at different segments of the limiting face 321 to provide additional continuous locking positions.

According to the above description, a person skilled in the art may conceive a battery pack and a vehicle which comprise the circumferential locking mechanism or the battery securing device. For example, to facilitate mounting of the battery pack to the vehicle, the second component, i.e. the limiting member, can be used to fix the battery securing device to the battery pack. In addition, in such a vehicle, the battery pack may be locked to the vehicle body of the vehicle via the battery securing device.

The technical scope of the invention is not intended to be limited to the content in the foregoing description. A person skilled in the art can combine the features in different embodiments or make various variations and modifications to the foregoing embodiments without departing from the technical concept of the invention, and these combinations, variations, and modifications shall all fall within the scope of the invention.

What is claimed is:

1. A circumferential locking mechanism, comprising:
 a first component comprising a first body and pins which extend from the first body in an axial direction and are distributed on the first body along a first circumference;
 a second component comprising a second body and a limiting face on the second body, the limiting face extending in a circumferential direction and comprising segments, the radius of the limiting face tapering in both the axial and circumferential directions at the segments; and
 a third component for impelling the first component to engage with the second component,
 wherein the first component and the second component are arranged such that the first circumference and the limiting face are coaxial, and when the first component is engaged with the second component, the pins abut against the limiting face.

2. The circumferential locking mechanism according to claim 1, wherein the number of the pins is the same as that of the segments, and the pins and the segments are evenly distributed in the circumferential direction, respectively.

3. The circumferential locking mechanism according to claim 1, wherein the segments are connected end to end.

4. The circumferential locking mechanism according to claim 1, wherein the pin is a cylindrical pin.

5. The circumferential locking mechanism according to claim 4, wherein the pin, at least at an end thereof, is a semi-cylindrical pin cut in a radial direction relative to the first circumference.

6. The circumferential locking mechanism according to claim 1, wherein the third component is a spiral spring.

7. The circumferential locking mechanism according to claim 1, wherein the limiting face is an outer peripheral side face of the second body, and the distance from the pin to the center of the first circumference is greater than the radius of the outer peripheral side face throughout the top thereof and less than the radius of the outer peripheral side face throughout the bottom thereof, and the pin has a sufficient length to engage with the outer peripheral side face throughout a circumference of the outer peripheral side face.

8. The circumferential locking mechanism according to claim 1, wherein the limiting face is an inner peripheral side face of the second body, and the distance from the pin to the center of the first circumference is less than the radius of the inner peripheral side face throughout the top thereof and greater than the radius of the inner peripheral side face throughout the bottom thereof, and the pin has a sufficient length to engage with the inner peripheral side face throughout a circumference of the inner peripheral side face.

9. The circumferential locking mechanism according to claim 1, wherein the limiting face comprises an outer peripheral side face and an inner peripheral side face of the second body, and wherein
 the distance from the pin to the center of the first circumference is greater than the radius of the outer peripheral side face throughout the top thereof but less than the radius of the outer peripheral side face throughout the bottom thereof, and the pin has a sufficient length to engage with the outer peripheral side face throughout a circumference of the outer peripheral side face; and the distance from the pin to the center of the first circumference is less than the radius of the inner peripheral side face throughout the top thereof but greater than the radius of the inner peripheral side face throughout the bottom thereof, and the pin has a sufficient length to engage with the inner peripheral side face throughout a circumference of the inner peripheral side face.

10. The circumferential locking mechanism according to claim 9, wherein the outer peripheral side face and the inner peripheral side face form a limiting groove, a radial width of the pin is less than the width of the limiting groove throughout a groove opening but greater than the width of the limiting groove throughout a groove bottom, and the pin has a sufficient length to extend into the limiting groove at any circumferential position and to engage with the outer peripheral side face and the inner peripheral side face.

11. The circumferential locking mechanism according to claim 10, wherein the limiting groove extends along a second circumference, the radius of the second circumference is the same as that of the first circumference, the center of the pin is on the first circumference, and a median line of the radial width of the limiting groove is on the second circumference.

12. A battery securing device, comprising the circumferential locking mechanism according to claim 1.

13. The battery securing device according to claim 11, wherein the first component is an adjustment member of the battery securing device, and the adjustment member is circumferentially fixed relative to a central pull rod of the battery securing device but is axially movable along the central pull rod; and the second component is a limiting member of the battery securing device.

14. A battery pack for a vehicle, comprising the battery securing device according to claim 12.

15. The battery pack according to claim 14, wherein the battery securing device is fixed to the battery pack via the second component.

16. A vehicle, comprising the battery securing device according to claim 12.

17. The battery securing device according to claim 12, wherein the number of the pins is the same as that of the segments, and the pins and the segments are evenly distributed in the circumferential direction, respectively.

18. The battery securing device according to claim 17, wherein the segments are connected end to end.

19. The battery securing device according to claim 17, wherein the pin is a cylindrical pin.

20. The battery securing device according to claim 19, wherein the pin, at least at an end thereof, is a semi-cylindrical pin cut in a radial direction relative to the first circumference.

21. The battery securing device according to claim 12, wherein the third component is a spiral spring.

22. The battery securing device according to claim 12, wherein the limiting face is an outer peripheral side face of the second body, and the distance from the pin to the center of the first circumference is greater than the radius of the outer peripheral side face throughout the top thereof and less than the radius of the outer peripheral side face throughout the bottom thereof, and the pin has a sufficient length to engage with the outer peripheral side face throughout a circumference of the outer peripheral side face.

23. The battery securing device according to any one of claim 21, wherein the limiting face is an inner peripheral side face of the second body, and the distance from the pin to the center of the first circumference is less than the radius of the inner peripheral side face throughout the top thereof and greater than the radius of the inner peripheral side face throughout the bottom thereof, and the pin has a sufficient length to engage with the inner peripheral side face throughout a circumference of the inner peripheral side face.

24. The battery securing device according to any one of claim 20, wherein the limiting face comprises an outer peripheral side face and an inner peripheral side face of the second body, and wherein
the distance from the pin to the center of the first circumference is greater than the radius of the outer peripheral side face throughout the top thereof but less than the radius of the outer peripheral side face throughout the bottom thereof, and the pin has a sufficient length to engage with the outer peripheral side face throughout a circumference of the outer peripheral side face; and the distance from the pin to the center of the first circumference is less than the radius of the inner peripheral side face throughout the top thereof but greater than the radius of the inner peripheral side face throughout the bottom thereof, and the pin has a sufficient length to engage with the inner peripheral side face throughout a circumference of the inner peripheral side face.

25. The battery securing device according to claim 24, wherein the outer peripheral side face and the inner peripheral side face form a limiting groove, a radial width of the pin is less than the width of the limiting groove throughout a groove opening but greater than the width of the limiting groove throughout a groove bottom, and the pin has a sufficient length to extend into the limiting groove at any circumferential position and to engage with the outer peripheral side face and the inner peripheral side face.

26. The battery securing device according to claim 25, wherein the limiting groove extends along a second circumference, the radius of the second circumference is the same as that of the first circumference, the center of the pin is on the first circumference, and a median line of the radial width of the limiting groove is on the second circumference.

\* \* \* \* \*